J. E. ANDREWS.
STRAW-CUTTER.

No. 188,837. Patented March 27, 1877.

WITNESSES
Nat. E. Oliphant.
Geo. R. Porter.

INVENTOR.
James E. Andrews
per Chas. H. Fowler,
Attorney.

UNITED STATES PATENT OFFICE.

JAMES E. ANDREWS, OF NEW YORK, N. Y.

IMPROVEMENT IN STRAW-CUTTERS.

Specification forming part of Letters Patent No. 188,837, dated March 27, 1877; application filed November 11, 1876.

*To all whom it may concern:*

Be it known that I, JAMES E. ANDREWS, of New York, in the county of New York and State of New York, have invented a new and valuable Improvement in Feed-Cutters; and I do hereby declare that the following is a full, clear, and exact description of the construction and operation of the same, reference being had to the annexed drawings, making a part of this specification, and to the letters and figures of reference marked thereon.

Figure 1:
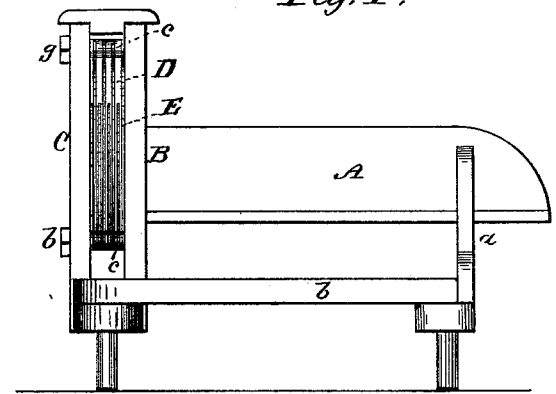
Figure 2:
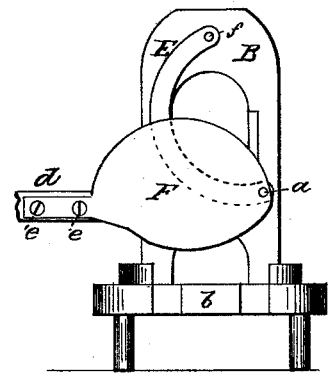
Figure 3:
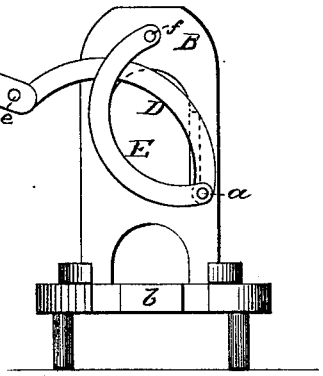
Figure 4:
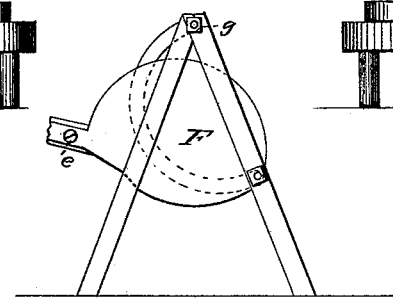

Figure 1 of the drawing is a representation of a side view of my invention. Fig. 2 is an end view with the front standard removed. Fig. 3 is a similar view with the plate removed. Fig. 4 is a modification of the frame or standard.

This invention has relation to straw or feed cutters; and consists in the peculiar construction of the knives and their guides, and the arrangement of them in relation to each other and in series, as will be hereinafter described, and subsequently pointed out in the claims.

In the accompanying drawings, A represents an ordinary box of a feed or straw cutter, suitably supported upon a frame consisting of a standard, $a$, and horizontal pieces or beams $b$, the inner end of said box resting within an opening for the passage of the material to be cut formed in an upright, B. An upright, C, may be secured to the upright B, and leaving sufficient space between the two to allow the free working of the knives.

The knives and their guides, which form the essential part of invention, are more fully illustrated by reference to Fig. 3 of the drawing.

The knives D are semicircular in form at their cutting-edges, and are placed within the space between the uprights B C, and work upon a bolt or pivot, $a$, passing through said uprights, and secured by a nut, $b$. These knives may be two or more in number, and kept at the desired distance apart, so as to cut the material either coarse or fine, by placing between them disks or washers $c$, of leather, soft metal, or other suitable material. These knives are secured within slots to a handle, $d$, by screws $e$.

Guides E, similar in form to the knives, are secured within the space between the two uprights by a bolt and nut, $f\,g$, and the bolt and nut $a\,b$, suitable packing-disks $c$ being used to keep them the proper distance apart.

It will be noticed that the guides are placed with its curves opposite to that of the knives and are stationary, while the knives move in an arc of a circle, making them more effective in their purpose.

Secured to the handle $d$, upon the outer side of the knives, is a plate, F, against which the material is forced when the upright C is dispensed with, and in place thereof two angular braces, as shown in Fig. 4.

It will be seen that the knives are of a semicircular form at their cutting-edges, and the semicircular form of the guides, and the position in which they are placed with relation to the cutting-edges of the knives, make a very effective cut, and when a circular box is used the form of the knives greatly facilitates the cutting.

Having now fully described my invention, what I claim as new, and desire to secure by Letters Patent, is—

1. The combination, with the semicircular knives D, of the stationary semicircular guides E, secured together and to the frame by bolts and nuts, as shown, and the packings $c$, as set forth.

2. The semicircular knives D, with plate F, in combination with the semicircular guides E, substantially as and for the purpose set forth.

In testimony that I claim the above I have hereunto subscribed my name in the presence of two witnesses.

JAMES EMOTT ANDREWS.

Witnesses:
 THOMAS BREWER,
 CHARLES GIDDINGS.